F. GRANGER.
VAPORIZER.
APPLICATION FILED DEC. 5, 1914.

1,292,759.

Patented Jan. 28, 1919.

WITNESSES.
J. R. Keller
John F. Will

INVENTOR.
Francis Granger

UNITED STATES PATENT OFFICE.

FRANCIS GRANGER, OF GREENSBURG, PENNSYLVANIA.

VAPORIZER.

1,292,759.　　　　Specification of Letters Patent.　　Patented Jan. 28, 1919.

Application filed December 5, 1914.　Serial No. 875,693.

*To all whom it may concern:*

Be it known that I, FRANCIS GRANGER, a citizen of the United States, and resident of Greensburg, in the county of Westmoreland and State of Pennsylvania, have invented a new and useful Improvement in Vaporizers; and I do hereby declare the following to be a full, clear, and exact description thereof.

Figure 1:
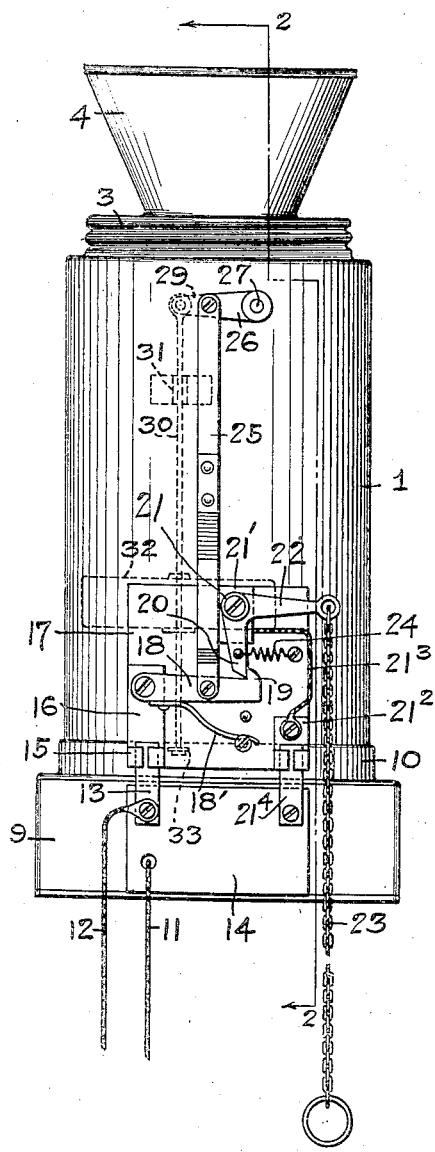
Figure 2:
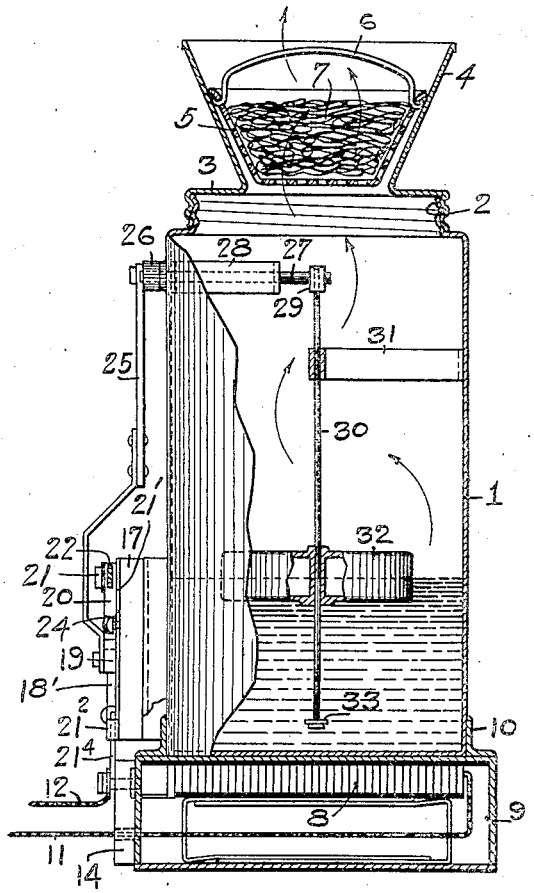

My invention relates to a vaporizing apparatus or an apparatus by which agreeable, healthful, and germ destroying vapors may be disseminated throughout an apartment of any character. The device is particularly useful for disseminating vapors throughout theaters, schools, hospitals, or other public buildings; or public carriers or vehicles; but its application is not confined to such uses as will be apparent from the following description. One object of the invention is to provide a retaining vessel for the fluid which is to be vaporized in combination with a heating unit for heating the fluid to cause the same to give off its vapors together with means whereby when the fluid reaches a certain reduced level the source of heat will be automatically cut off. A further object is to so arrange the heat cutting-out apparatus that the same will serve as an indicator to show whether or not the device is in operation. Other objects and advantages of the invention will be apparent from the following description in connection with the accompanying drawings, which show a preferred embodiment of the invention, and in which Figure 1 is a side elevation, showing the heat controlling devices, and Fig. 2 is a vertical sectional view on the line 2—2, Fig. 1. In the embodiment of the invention herein selected for illustration, 1 indicates the fluid retaining vessel. This is preferably provided with a threaded top 2 to receive a cover 3, which cover is provided with a funnel shaped member 4 opening into the interior of the vessel and through which the vapor may pass out into the room or apartment. If desired, the funnel may be provided with a removable wick containing basket 5, having a handle 6, by which the same may be readily placed within or removed from the funnel. The basket is perforated or formed of foraminated material to permit the more or less free passage of the vapors from the vessel. The wick 7 contained in the basket 5 may be utilized for either of two purposes. It may be saturated with the fluid from which the desired vapors are to be dispensed, and in such cases the liquid within the vessel 1 may be simply water or other suitable vapor producing fluid. On the other hand, the wick material may act as a mere strainer for the fluids given off by the liquid within the retainer 1. The wick may have the further function of modifying the character of the vapors given off by the liquid, by saturating said wick with a fluid of a somewhat different character.

For heating the vessel 1 any suitable form of heat unit or means may be employed, but I prefer to utilize an electric heating unit diagrammatically indicated at 8, and inclosed within a hollow stand or base 9, having an angular flange 10 at its top to receive and hold the fluid containing vessel 1 thereon. One of the electric connections for said heat unit is indicated at 11, and connects directly with the heat unit. The other connection is indicated at 12, and connects with a contact member 13 mounted on insulating block 14, the upper end of said contact 13 being adapted to slip beneath clips 15 of a second contact member 16, secured upon an insulating block 17, carried by the containing vessel 1. Pivoted upon the contact strip 17 is a latch member 18, having the latch end 19 adapted to engage one arm 20 of a bell crank trip latch member pivoted at 21 on a contact strip 21', connected with a contact strip $21^2$ by a short conductor $21^3$, which strip $21^2$ contacts with a strip $21^4$, which is connected with the other terminal of a heating unit 8.

A light spring 18' holds the latch 18 in elevated position. The other arm 22 of said bell crank member is provided with a convenient chain or cord 23 whereby said member may be operated as hereinafter described. The arm 20 of the bell crank member is normally held in contact with the latch shoulder 19 of the latch 18 by means of the springs 24 and 18'. Connected with the latch member 18 is a rod or bar 25, part of which may be made of insulating material. The upper end of this bar is connected with a rock arm 26 fixed on a shaft 27, which is journaled in a sleeve 28, secured to the inner wall of the retaining vessel 1. The opposite end of the shaft 27 has fixed thereto a second block arm 29 within the retaining vessel and from this arm is suspended a float rod 30, guided in an arm 31 within the vessel 1, and having slidably mounted thereon, a hollow or otherwise buoyant float 32. The lower end of the float rod 30 has an abutment 33 to prevent the float 32 from dropping off the end of said rod.

In the operation of the device, the vessel 1 is filled with the liquid to be vaporized to the required height, thereby raising the float 32 above the end of the rod 30, it being understood that the float slides freely on said rod. The contact latch 18 is then snapped into engagement with the arm 20 of the bell crank member by simply drawing down on the cord 23, the beveled face of the arm 20 riding over the beveled face of the latch head 19. These two members are held in engagement and in electrical contact by means of the float 32 and connections described. By following the electrical circuit, it will be seen that this operation completes the electrical connection of the heat unit with its source of energy.

As the level of the liquid in the vessel 1 falls, the float 32 approaches the lower end of the rod 30, and when the liquid reaches its lowest level within the limit of safety, the float rests upon the abutment 33 of said rod 30. A further reduction of the level of the liquid will free the float more or less from the liquid, converting said float into a weight pulling down on the rod 30 and thence through rock arms 29 and 26 and the connecting rod 25, depressing the latch member 18 until it is free from the bell crank arm 20, whereupon the spring 24 draws said arm out of engagement with said latch member, thus breaking the electric circuit of the heat unit. Vaporization of the liquid gradually ceases as the liquid cools, leaving a sufficient amount of liquid in the retaining vessel to obviate all danger of burning out the retaining vessel 1. Furthermore, the disengagement of the latch member 18 and the bell crank member will be readily observable as the parts are exposed on the outside of the device, thus serving as an indicator to show whether or not the apparatus is in operation.

The function of the wick basket 5 and its wick 7 has been sufficiently indicated above to need no further description.

It will be observed that the construction of the vaporizer is such that the electrical heating circuit cannot be completed unless there be sufficient fluid in said container to render it operative; this effectually eliminates the possibility of danger of fire or of burning out the apparatus.

While I have described herein a preferred embodiment of the apparatus and of the invention, it is to be understood that the same may be altered in details and relative arrangement of parts within the scope of the appended claims.

What I claim is:

1. A vaporizer comprising a fluid container, having a vapor dispensing opening, an electric heat unit for said container, a circuit breaker mounted on the outer wall of said container, a float within said container, operative connections between said float and said circuit breaker, whereby when said float falls to a predetermined point, it will operate said circuit breaker to break the circuit, said circuit breaker serving as an indicator to show the condition of the apparatus.

2. A vaporizer comprising a fluid container having a vapor dispensing opening, a base or support for said container, containing an electric heating unit, contact strips on said base and on said container respectively adapted to be electrically connected when the container is mounted on said base, a circuit breaker on the outside of said container adapted to be electrically connected with said contact strip, a float within said container, operative connections between said float and said circuit breaker, whereby when said float falls to a predetermined point, the circuit breaker will be operated to break the circuit of the heat unit, said circuit breaker serving also as an indicator to show the condition of the device and a manually operable member for restoring said circuit breaker to operative position to complete the circuit.

In testimony whereof, I the said FRANCIS GRANGER, have hereunto set my hand.

FRANCIS GRANGER.

Witnesses:
 JOHN F. WILL,
 J. R. KELLER.